Oct. 14, 1969 M. T. BASSECHES 3,472,970

MAGNETIC RECORD PLAYBACK DEVICE WITH MANUALLY OPERATED
HEAD-LIFTING, RETRACTOR ASSEMBLY

Filed Sept. 7, 1967 2 Sheets-Sheet 1

INVENTOR.
MARK T. BASSECHES

BY Mark Basseches

ATTORNEY

Oct. 14, 1969 M. T. BASSECHES 3,472,970

MAGNETIC RECORD PLAYBACK DEVICE WITH MANUALLY OPERATED HEAD-LIFTING, RETRACTOR ASSEMBLY

Filed Sept. 7, 1967 2 Sheets-Sheet 2

INVENTOR.
MARK T. BASSECHES

BY Mark Basseches

ATTORNEY

United States Patent Office 3,472,970

Patented Oct. 14, 1969

3,472,970

MAGNETIC RECORD PLAYBACK DEVICE WITH MANUALLY OPERATED HEAD-LIFTING, RETRACTOR ASSEMBLY

Mark T. Basseches, Pleasantville, N.Y., assignor to Creative Systems, Inc., New York, N.Y., a corporation of New York Filed Sept. 7, 1967, Ser. No. 666,101
Int. Cl. G11b *5/78*
U.S. Cl. 179—100.2 4 Claims

ABSTRACT OF THE DISCLOSURE

A playback device or the like for translating information on an information bearing strip, such as a strip of magnetic tape, including a carriage or slider member mounted for linear movement along a base which may be disposed adjacent an information bearing strip, such as a magnetic tape, the device including a tape head in intimate contact with the tape during playing movements and being characterized by means for automatically spacing the head from the tape responsive to retracting movements of the carriage, thereby to greatly reduce head wear and prevent the production of undesired sounds.

BACKGROUND OF THE INVENTION

Field of the invention

This invention is in the field of playback devices, and more particularly is in the field of playback devices for deriving information from an information strip, such as a length of magnetic tape which is mounted on a card or the like bearing coordinated visual or tactile information, such as lettering, Braille characters or other indicia, the indicia corresponding to the information of the tape.

Description of the prior art

It is known to provide a card having lettering or other indicia with a strip or strips of magnetic tape or the like data storage media, the information of the strip being juxtaposed to lettering, etc. Such cards are used in conjunction with a playback or read-out mechanism which scans the strip and the indicia at the same time, so as, for instance, simultaneously to sound out the material spelled out by the indicia.

Numerous forms of read-out mechanisms have been proposed. However, all such prior mechanisms have suffered from one or more of the following drawbacks: high initial cost; complexity of operation; inability readily to be set to play some but not all of the message recorded on the magnetic strip; high head wear, with consequent rapid loss of fidelity and high repair costs.

As a result of the foregoing drawbacks, no one has, to date, marketed an inexpensive playback device suitable for use with cards of the type above described, which may be operated by an unskilled person, such as a child learning to read, which may readily be reset for repetition of selective portions, for instance only a single word of the total message on the tape, and which is nonetheless able to withstand the rough usage which may be expected in the field.

It is known, for instance, to provide a card reading machine which bodily shifts the card across a read-out mechanism, providing an aural response corresponding to the information printed on the moving card. Such devices, in addition to their extremely high cost, cannot be operated by the average pupil and are further disadvantageous in that the card moves, rendering reading of the indicia difficult.

Certain of such devices may be used to play only the entire card and not merely a selected portion. In other devices there exists the capability of playing back certain portions, but such playback requires the operation of several controls, well beyond the capabilities of younger pupils or blind persons, for instance, and it is often more time consuming to operate the device in a manner to play back a portion of a card than it is to play the entire card again.

A further difficulty encountered in connection with the prior art devices in which partial replays may be effected, is unduly high tape head ware and the production of loud, squealing noises during the retro movement of the read-out mechanism.

As is well known, in the use of magnetic tape for example, the gap of the tape head must be maintained to provide a very small clearance, particularly where there is a relatively slow movement of the tape relative to the head. Any significant wear is accompanied by a considerable loss of fidelity, particularly at the higher frequencies necessary for the reproduction of sibilants.

In certain prior known devices which permit retro movement to repeat part of a tape strip, the reverse scanning of the tape head over the strip has resulted in the production of undesirable noise, since currents are induced in the head in the course of the retro as well as the forward movement of the head. If very rapid retro movement of the head is effected, as might be expected by younger operators eager to repeat an area of the tape, the value of the current produced may exceed by a considerable margin the normal values occuring in the proper and slower playback movements of the head. Additionally, rapid movements result in the production of high frequency currents. The higher frequencies plus the increased amplitude will produce higher sound levels than desired, will prove painful if ear phones are employed, and may overload the apparatus, causing permanent damage to the reproducing equipment. Additionally, tape wear is greatly multiplied when the head is moved rapidly across the tape rather than slowly.

Certain known devices have resorted to the use of complex limit switches to avoid the noise production problems during retro movement, but these devices require complete replay of the card. Also, the introduction of such switches increases the cost of the device, increases the likelihood of breakdown of the device through switch failure, and does not solve the tape head wear problem.

SUMMARY OF THE INVENTION

A playback mechanism for the playback of a magnetic tape strip or the like secured to a card having juxtaposed information, including a base, a carriage movably mounted on the base including a playback head adapted to be positioned over and scan the magnetic strip, the carriage having means for retro movement of the head for back spacing the head with respect to the card, retraction of the carriage being automatically accompanied by a lifting of the head from contact with the strip, with or without interruption of current in the amplification circuit, whereby no wear on the tape head is effected during such retro movement and the production of undesired noise during the retro movement is eliminated.

It is accordingly an object of the invention to provide an inexpensive playback mechanism for cards of the type described, which is simple in construction, easily operated, and which is capable of being back-spaced for reproduction of any selected part of the information on the card without the operation of switches or other controls.

A further object of the invention is the provision of a device of the class described which may be back-spaced by an unskilled operator without undue head wear and without the production of squeals and garbled sounds normally associated with retro movement of tape devices.

It is a further object of the invention to provide, in combination, a support surface, read-out device and a card or series of cards wherein alignment or orientation of the cards with respect to the read-out device, etc. may be readily and precisely effected.

To attain these objects and such further objects as may appear herein or be hereinafter pointed out, reference is made to the accompanying drawings, forming a part hereof, in which.

Figure 1:
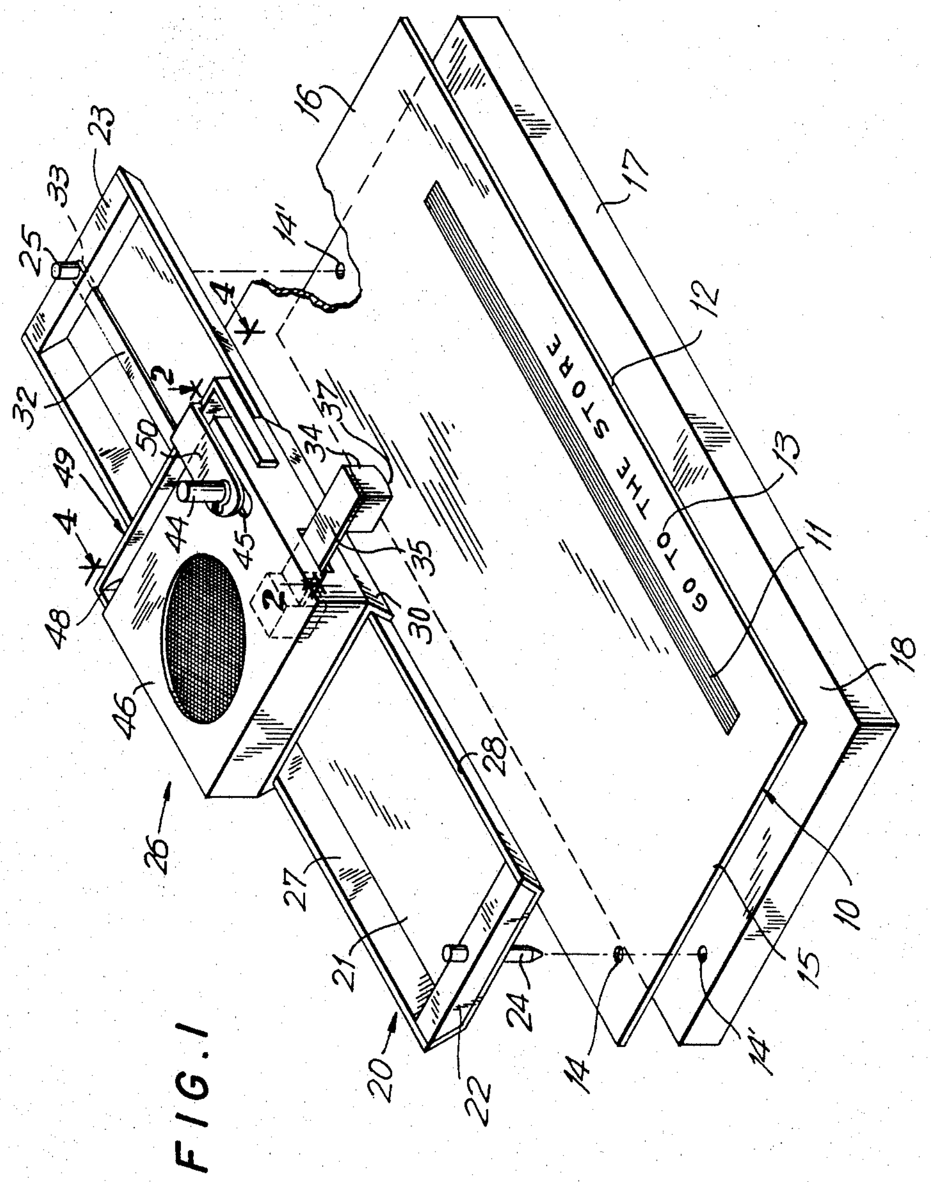
FIGURE 1 is an exploded perspective view of a playback device, card therefor and a support member in accordance with the invention.

In accordance with the invention, 10 is a card of known type which may be fabricated of paper, oak tag or the like, having a strip 11 of magnetic recording tape affixed thereto in spaced parallel relation to the marginal edge 12 of the card. Spaced from the strip 11 is a row 13 which may be comprised of letters, numerals, Braille characters, musical notes, etc. The card 10 is provided with spaced alignment apertures 14 adjacent the side edges 15, 16 thereof. Optionally but preferably, the device is used in conjunction with a support block 17 having a flat upper surface 18, the block being provided with spaced apertures 14', 14' which register with the apertures 14, 14 formed in the card.

The playback apparatus 20 comprises a base 21 of generally trapezoidal configuration in vertical section, with the smaller of the two bases of the trapezoid being disposed lowermost. A pair of end stops 22, 23 are mounted at the opposite ends of the base, the end stops including location pegs 24, 25 which are spaced to register with the apertures in the card and the support block 14, 14', respectively, it being understood that the pegs 24, 25 of the playback apparatus are inserted through the apertures 14 of the card and 14' of the support block positively and accurately to locate the three noted elements with respect to each other.

Figure 4:
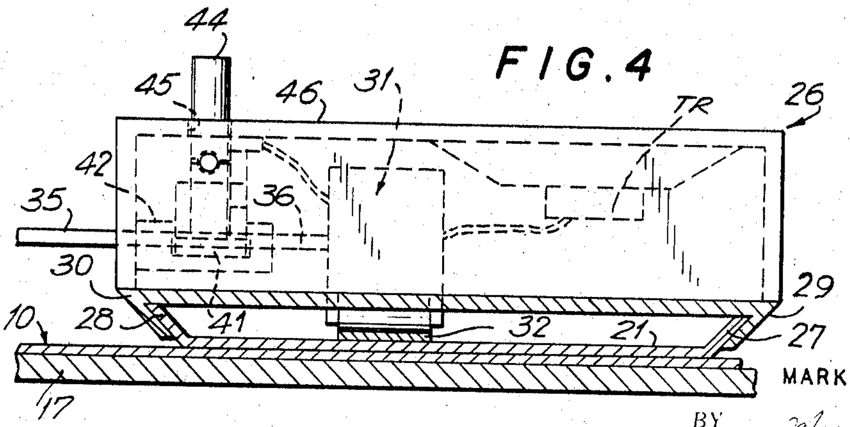
FIGURE 4 is a section taken on the line 4—4 of FIGURE 1, the exploded parts of FIGURE 1 being assembled for purposes of this figure.

A carriage assembly 26 is mounted for sliding movement along the downwardly converging side walls 27, 28 of the base. The carriage, as best seen in FIGURE 4, includes downwardly converging, inclined side walls 29, 30 which lie against the walls 27, 28, respectively, of the base to permit linear sliding movement of the carriage, without any vertical movement of the carriage with respect to the base.

The carriage is normally urged toward the end 23 of the base by a spring assembly 31 which is preferably of the well known negator type, including an extended spring band 32, the uppermost end 33 of which may be seated or mounted on the location peg 25. The negator assembly acts, when the carriage is shifted to the left as shown in FIGURE 1, to urge the carriage toward the end peg 25 with substantially a constant force, as is well known in connection with negator actuator assemblies.

Preferably a governor mechanism is interposed between the carriage 26 and the base to resist with uniform force the movement of the carriage toward the end peg 25 so that the carriage, when shifted to the left, either fully or partially, will return to the right as shown in FIGURE 1 at a uniform, slow rate which may be in the order of about one and seven-eighths inches per second.

As negator and spring assemblies and governors are well known and form no part of the present invention, further discussion of details thereof is believed unnecessary.

It will be understood that other means for causing the carriage to advance toward the end peg 25 may be substituted for the disclosed combination of spring and governor.

The carriage 26 carries the usual electronic components, namely, a transducer TR which may function as a loudspeaker and a microphone as well, under some circumstances, a transistorized amplifier (not shown), batteries or other power source (not shown) and a magnetic playback or playback-record head 34.

The head 34 in the illustrated embodiment is carried on an extension arm 35 to space the head from the carriage so that the head may overlie the magnetic strip 11 when the playback unit is properly positioned over the card. The arm 35 provides a degree of vertical movement for the head 34, which vertical component of movement may be enabled either through a pivotal mounting of the inner end 36 of the arm or through the inherent resilience of the arm itself. It will be understood that a relatively small degree of vertical movement is all that is required.

When the playback is assembled with the card 10 and base member 17, the under or gap defining surface 37 of the head 34 will be in direct contact with the strip 11. It will thus be seen that when the carriage, at any intermediate position along the length of the tracks defined by walls 27, 28 is released, the head will be wiped over the magnetic strip, hte currents induced in the head being fed to the amplification circuit, whereupon the amplified signals fed to the loudspeaker device 33 will result in a sonic presentation corresponding to the information on the magnetic strip.

In accordance with the invention, means are provided for automatically lifting the under surface 37 of the head from contact with the strip during retro movement of the carriage, i.e. movements from right to left as shown in FIGURE 1. The retro movements are provided by a retractor assembly 40, including a slide bar 41 which is journalled for movement in a horizontal plane in slide bearing 42 forming a part of the carriage. A lift cam 43 is formed at the inner (lefthandmost) end of the slide bar 41.

To the forward end of the slide bar there is attached a retractor post 44 which extends upwardly through an elongated slot 45 formed in the upper cover 46 of the carriage. The retractor post and, hence, the slide bar 41 are normally urged to the righthandmost or solid line position shown in FIGURE 3 by a tension spring 47 stressed between front wall 48 of the carriage and the post 44. However, the post 44 and slide bar 41 may be shifted to the left, as shown in FIGURE 3, by the application of a leftward pressure against the post or against a bumper mechanism 49 which is pivotally attached to the post.

The bumper 49 preferably comprises a U-shaped element surrounding the lead edge 48 of the carriage and some or all of the adjacent parts of the side edge of the carriage. The bumper is attached to the retractor post 44 by an attachment tab 50, the tab including an attachment aperture 51 fitted within a support ring 52 formed on the post 44. Obviously other means of securing the bumper to the retractor may be employed.

Figures 2, 3:
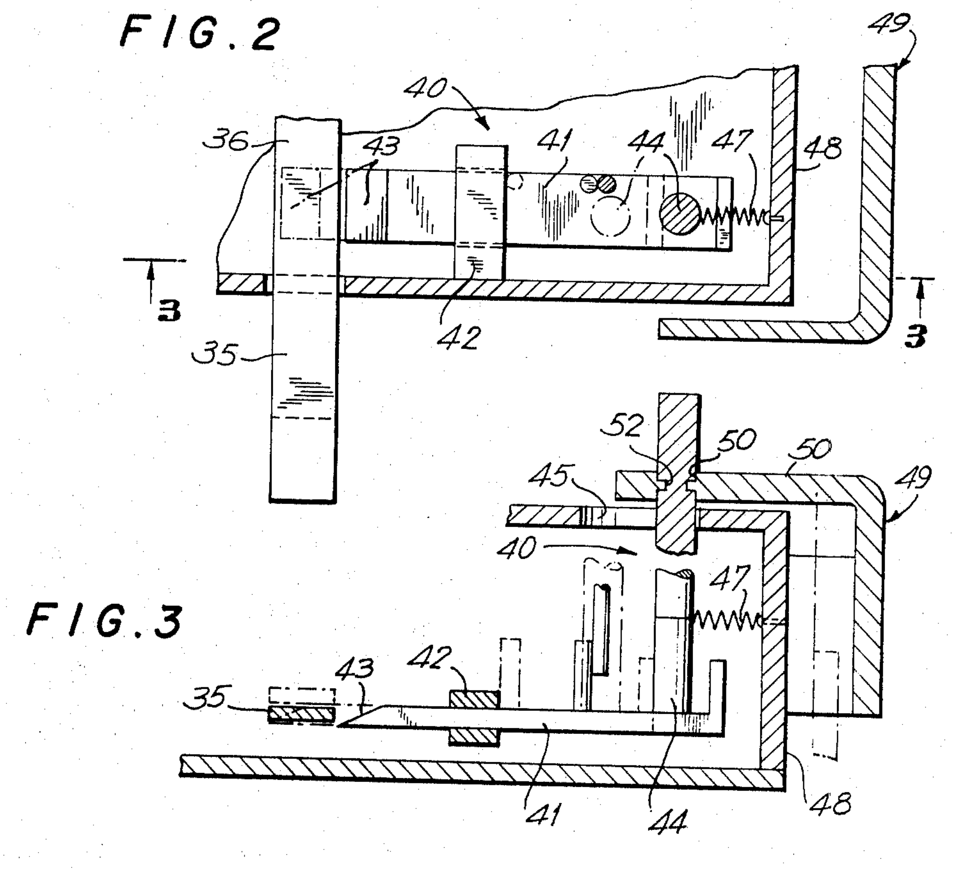
FIGURE 2 is a magnified section taken on the line 2—2 of FIGURE 1.
FIGURE 3 is a magnified section taken on the line 3—3 of FIGURE 2, illustrating the location of the parts in two operating positions of the device.

From the foregoing it will be seen that any right to left pressure exerted against the retractor post 44 of the bumper assembly 49 affixed to the post will introduce a concomitant right to left movement of the slide bar 41 within the carriage, causing the cam surface 43 of the bar to engage under and lift the arm 35 from the solid to the dot and dash position shown in FIGURE 3, in which dot and dash position the under surface 37 of the tape head will be cleared a small but effective distance above the magnetic tape. Since the spring force which urges the carriage from left to right exerted by the negator spring assembly exceeds the force exerted by the spring 47, it will be appreciated that when a right to left force is exerted against any portion of the retractor assembly at any point in the operating cycle, the head will be lifted prior to any right to left movement of the carriage. Thus, by reason of the lost motion effect, even the initial retro movement of the head will be effected, with the head cleared from contact with the magnetic strip, thus avoiding any wear on the operative face of the head. Since the head has been separated from contact with the strip, it will not be necessary to interrupt the circuit to the amplifier due to the fact that through such separation no audible signal will be generated during the retro movement.

It will thus be seen that the retractor assembly serves the double function of preventing tape head wear and eliminating audible response during retro movement, without the requirement for interrupting the circuit through the amplification apparatus.

Optionally but preferably, the bumper assembly 49 may extend around the carriage to such a degree that it is inconvenient to retract the carriage by any means other than pressure against said bumper portion. In addition, the bumper may be disposed in such position as to contact the location peg 25 or some other fixed portion of the base at the completion of a playback stroke, so that the desired head lifting is automatically effected upon completion of the playback stroke.

From the foregoing it will be evident that there is provided a simple, inexpensive, and easily operated playback apparatus wherein it is readily possible to play and replay selected portions only of a magnetic strip. The operation to effect resetting may be simply carried out and may be effected without undue head wear or the production of undesired noises.

Obviously limit switches may, if desired, be employed in conjunction with the retractor assembly, so that when the retractor assembly is shifted relative to the carriage by the application of pressure against the retractor assembly, the power in the circuit to the amplifier may be automatically interrupted to prolong battery life, in addition to lifting of the tape head.

Preferably elements of the retractor assembly are located about those portions of the carriage which would be naturally grasped by a user in retracting the carriage.

While the head 34 and the bar 35 have been shown exposed in the illustrated embodiment, these elements may preferably be located within the carriage per se, and a scanning slot, to permit access of the head to the tape, may be provided through the base 21.

It will be readily understood by those skilled in the art that variations of the principles herein set forth may be made without departure from the spirit of the invention and, accordingly, the invention is to be broadly construed within the scope of the appended claims.

Having thus described the invention and illustrated its use, what is claimed as new and is desired to be secured by Letters Patent is:

1. A playback device or the like for translating information recorded on an information bearing strip, such as a strip of magnetic tape, comprising a base portion, a carriage mounted on said base portion for movement in a predetermined path, drive means interposed between said carriage and base portion for moving said carriage toward one end of said from the other end of said path, a tape head mounted on said carriage for movement along a predetermined locus when said carriage moves along said path toward said one end, spring means connecting said tape head to said carriage and yieldingly urging said head toward said locus, manually operable retractor means mounted on said carriage capable of being actuated at any time during said movement of said carriage in said path and movable relative to said carriage in the direction of said path for shifting said carriage toward said other end of said path responsive to pressures exerted against said retractor means in the direction of said other end, and head lift means operatively associated with said retractor means and said spring means for shifting said head away from said locus responsive to pressures against said retractor means in the direction of said other end and in advance of said retractile movement of said head toward said other end.

2. A device in accordance with claim 1 wherein said retractor means includes portions disposed at a head edge of said carriage as said carriage moves toward said one end of said path.

3. A device in accordance with claim 2 wherein said drive means comprises spring motor means, and said base portion includes an abutment member positioned to engage said retractor means and shift said retractor means relative to said carriage in the direction of said other end, thereby to clear said head from said locus under the force exerted by said motor means when said carriage is at said one end of said path.

4. A device in accordance with claim 1 wherein said head lift means comprises a cam portion on said retractor and a follower portion on said spring means, said cam and follower being shifted into engagement responsive to said pressures against said retractor means.

References Cited

UNITED STATES PATENTS

| | | | |
|---|---|---|---|
| 2,849,542 | 8/1958 | MacChesney | 179—100.2 |
| 3,185,776 | 5/1965 | Bender | 179—100.2 |
| 3,251,263 | 5/1966 | Gerry | 179—100.2 |
| 3,255,537 | 6/1966 | Cole et al. | 35—35 |
| 3,348,320 | 10/1967 | Brokaw | 35—35 |

BERNARD KONICK, Primary Examiner

JEROME P. MULLINS, Assistant Examiner

U.S. Cl. X.R.

35—35